United States Patent
Verma et al.

(10) Patent No.: US 11,924,020 B2
(45) Date of Patent: Mar. 5, 2024

(54) RANKING CHANGES TO INFRASTRUCTURE COMPONENTS BASED ON PAST SERVICE OUTAGES

(71) Applicant: Microsoft Technology Licensing, LLC, Redmond, WA (US)

(72) Inventors: Nidhi Verma, Bellevue, WA (US); Rahul Nigam, Bothell, WA (US); Sudharsan Ganesan, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/729,278

(22) Filed: Apr. 26, 2022

(65) Prior Publication Data

US 2023/0344700 A1 Oct. 26, 2023

(51) Int. Cl.
*H04L 41/0631* (2022.01)
*H04L 41/0604* (2022.01)
*H04L 41/0668* (2022.01)
*H04L 41/0686* (2022.01)

(52) U.S. Cl.
CPC ...... *H04L 41/0631* (2013.01); *H04L 41/0627* (2013.01); *H04L 41/0668* (2013.01); *H04L 41/0686* (2013.01)

(58) Field of Classification Search
CPC ............. H04L 41/0627; H04L 41/0631; H04L 41/0668; H04L 41/0686
USPC ....................................................... 709/224
See application file for complete search history.

(56) References Cited

U.S. PATENT DOCUMENTS

| | | | |
|---|---|---|---|
| 7,941,296 B2 * | 5/2011 | Fluegge | G06Q 10/06 702/182 |
| 2003/0004765 A1 * | 1/2003 | Wiegand | G06Q 10/06 702/184 |
| 2006/0120411 A1 * | 6/2006 | Basu | H04L 67/101 370/539 |
| 2006/0218395 A1 * | 9/2006 | Maes | H04M 15/31 713/167 |
| 2007/0204166 A1 * | 8/2007 | Tome | H04L 63/0853 713/182 |
| 2011/0314138 A1 | 12/2011 | Kobayashi et al. | |
| 2017/0178038 A1 | 6/2017 | Guven et al. | |
| 2017/0180191 A1 * | 6/2017 | Coburn | H04L 41/0631 |
| 2017/0357659 A1 * | 12/2017 | Mackovitch | G06F 11/1446 |
| 2019/0379574 A1 * | 12/2019 | Sun | H04L 41/0631 |
| 2020/0358313 A1 * | 11/2020 | Fox | H02J 13/0062 |
| 2020/0404016 A1 * | 12/2020 | Pike | H04L 63/1433 |
| 2022/0103576 A1 * | 3/2022 | Compton | H04L 63/20 |

OTHER PUBLICATIONS

"International Search Report and Written Opinion Issued in PCT Application No. PCT/US23/014854", dated Jun. 2, 2023, 13 Pages.

* cited by examiner

*Primary Examiner* — David P Zarka
(74) *Attorney, Agent, or Firm* — Novo TechIP International PLLC

(57) ABSTRACT

A data processing system is implemented for detecting changes to infrastructure components, and extracting metadata associated with the changes. The data processing system also implements grouping the changes based on the metadata, ranking the groups of changes based on past incidents of service outages, and displaying the ranked groups of changes to a user.

17 Claims, 7 Drawing Sheets

RANKING CHANGES TO INFRASTRUCTURE COMPONENTS BASED ON PAST SERVICE OUTAGES

BACKGROUND

Generally, at any minute, there may be scheduled and unscheduled code changes and configuration updates across various infrastructure components supporting cloud services. Further, these changes may result in reliability issues for users of the cloud services.

Hence, there is a need for improved systems and methods of root cause detection for reliability issues in cloud services.

SUMMARY

An example data processing system according to the disclosure may include a processor and a machine-readable medium storing executable instructions. The instructions when executed cause the processor to perform operations including detecting changes to infrastructure components; extracting metadata associated with the changes; grouping the changes based on the metadata; ranking the groups of changes based on past incidents of service outages; and displaying the ranked groups of changes to a user.

An example method implemented in a data processing system includes detecting changes to infrastructure components; extracting metadata associated with the changes; grouping the changes based on the metadata; ranking the groups of changes based on past incidents of service outages; and displaying the ranked groups of changes to a user.

An example machine-readable medium on which are stored instructions. The instructions when executed cause a processor of a programmable device to perform operations of detecting changes to infrastructure components; extracting metadata associated with the changes; grouping the changes based on the metadata; ranking the groups of changes based on past incidents of service outages; and displaying the ranked groups of changes to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
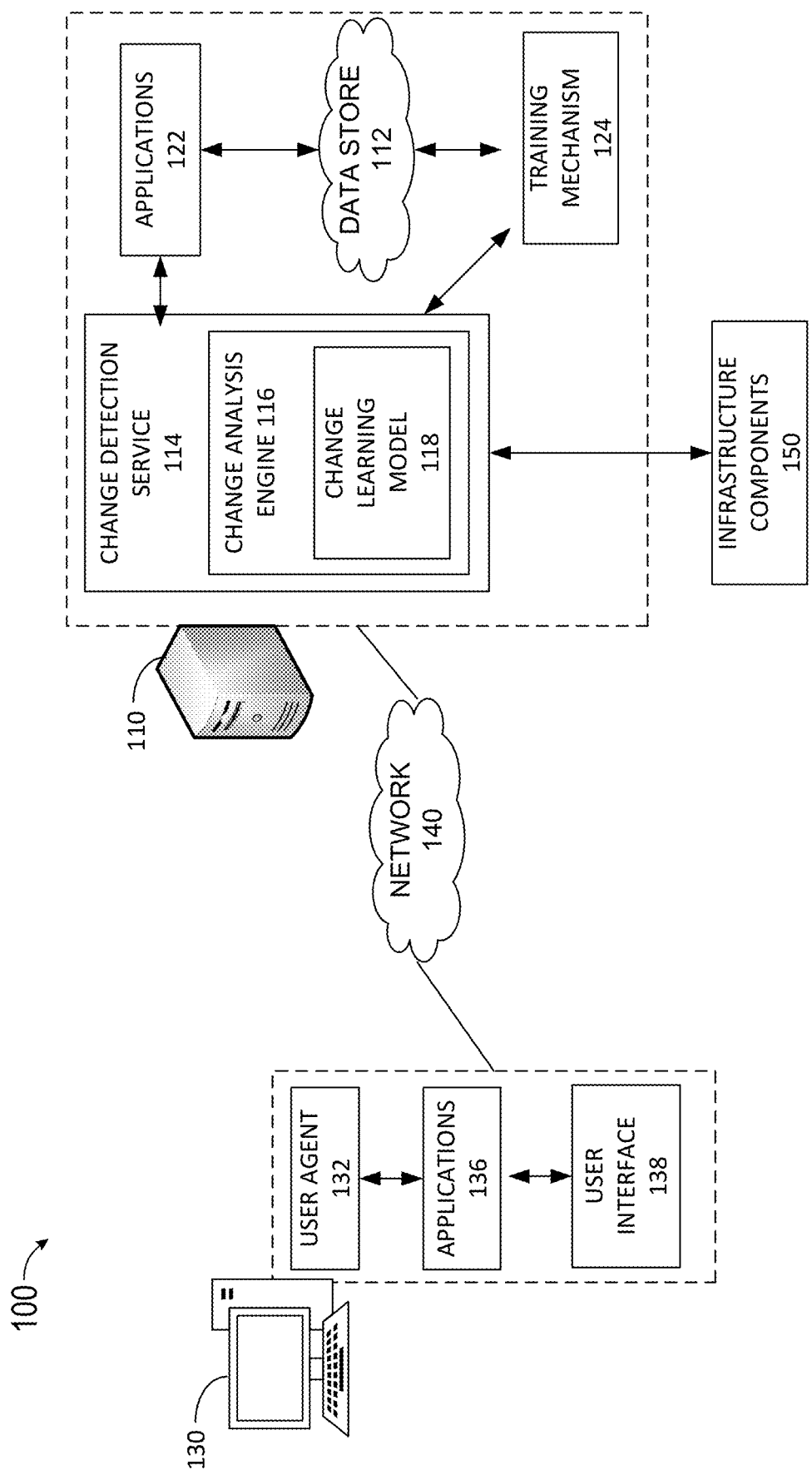
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, cloud services are supported by various infrastructure components. Examples of infrastructure components include tenants, farms, virtual machines, physical machines, user properties, and site collections, amongst other infrastructure components. Changes in these infrastructure components may result in users experiencing reliability issues, e.g., a service outage, with respect to the cloud services. As an example, a reliability issue may result from scheduled and unscheduled code changes applied to these infrastructure components. As another example, a reliability issue may result from configuration updates applied to these infrastructure components. Specific examples of configuration updates include a change in an operating system of an infrastructure component and/or a change in a security certificate of an infrastructure component. In this way, many different types of changes may result in reliability issues for users of the cloud services.

One technical problem which arises in attempting to debug and address the reliability issue is determining a root cause of the issue. However, finding the root cause is relatively difficult since cloud services may implement hundreds of components, each of which may have hundreds of changes applied to them. Currently, to find the root cause of a reliability issue, subject matter experts for each component execute reports on their respective infrastructure component to determine whether and when changes occurred on the component. These subject matter experts are needed because there is a lack of an aggregated view which shows what changes occurred to which components during a given time period. Accordingly, executing all of these reports raises another technical problem of consuming computing resources.

To address these technical problems and more, this description discloses technical solutions for providing information of all changes in infrastructure components in a centralized place. In embodiments, aspects of the instant application map, organize, and/or label all changes which occurred to the infrastructure components supporting the cloud service during a given time period. As an example of organizing, aspects of the instant application provide rankings for types of changes based on risk tagging within various groupings. In further embodiments, aspects of the instant application implement a correlation algorithm which correlates changes to infrastructure components to past incidents of reliability issues with a relatively high accuracy. As an example, aspects of the instant application provide correlations based on past incidents in last XX days or YY severity or ZZ blast radius of impact. In embodiments, this correlation allows for ranking groups of changes. Further, aspects of the instant application display all of this information to a user in a user interface, thereby making visible to a user any changes which may have caused a current reliability issue. These technical solutions provided by the instant application bring down a current amount of time needed to investigate the reliability issue, e.g., down from a couple of hours to potentially a few minutes.

As a general matter, the methods and systems described herein may include, or otherwise make use of, a machine-trained model to identify words from speech data. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify changes in infrastructure components which support cloud services, determine associations between these changes and/or identify associations between these changes and services outages. Such determination may be made following the accumulation, review, and/or analysis of changes applied to infrastructure components over time, that may be configured to provide the ML algorithm (MLA) with an initial or ongoing set of training data. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of changes to infrastructure components and/or to increase the training data for future identification of changes of infrastructure components.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a stacked trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a server 110 which may be connected to or include a data store 112 which may function as a repository in which datasets relating to training models, data relating to a change detection service 114 and/or data relating to applications 122 may be stored. In further embodiments, the data store 112 is a federal change management service which serves as a central repository for infrastructure change data which details changes to the infrastructure components 150. Although shown as a single data store, the data store 112 may be representative of multiple storage devices and data stores which may be connected to each of the change detection service 114, applications 122 or change learning model 118. Moreover, the server 110 may include a plurality of servers that work together to deliver the functions and services provided by each service or application. The server 110 may operate as a shared resource server located at an enterprise accessible by various computer client devices such as client device 130. The server 110 may also operate as a cloud-based server for offering change recognition services in one or more applications such as applications 122.

The server 110 may include and/or execute the change detection service 114 which may provide infrastructure change recognition utilizing an application on their client devices such as client device 130. The change detection service 114 may operate to detect infrastructure change data detected from a user's client device 130 and/or infrastructure components 150 via an application (e.g., applications 122 or applications 136), examine the detected infrastructure change data, and provide feedback to the user regarding changes to the infrastructure components 150.

In embodiments, the change detection service 114 may detect changes to infrastructure components 150 by examining service trees of the infrastructure components 150. Specifically, a service tree is a source of information which spans all infrastructure and platforms for a cloud service and provides information for all offerings, services, components, and endpoints that support the cloud service. In this way, a service tree is a single listing of assets that enable all systems, offerings, services, components, and endpoints to be discoverable and universally referenced using a single source. In embodiments, the change detection service 114 may detect changes to the infrastructure components 150 by examining object maps of the infrastructure components 150, in addition to or instead of the service trees. Specifically, the object maps are maps which illustrate relationships across physical assets and logical assets of the infrastructure components 150. As an example, an object map may illustrate a relationship between a server of the infrastructure components 150 and a data storage which the server utilizes.

In embodiments, the change detection service 114 may utilize a change analysis engine 116 which examines service trees of the infrastructure components 150 for identification of changes to infrastructure components 150. To achieve this, the change analysis engine 116 may make use of machine learning models, i.e., the change learning model 118, which operates to identify changes to the infrastructure components 150.

In embodiments, the change detection service 114 further utilizes the change analysis engine 116 to extract metadata associated with the changes. Specifically, the change analysis engine 116 uses machine learning models, i.e., the change learning model 118, to extract metadata from the data of changes to the infrastructure components 150. Examples of metadata include a type of infrastructure component the change was applied to, a location of the infrastructure component, a type of change which occurred, a time of and/or date of a change occurring, and a stage of when the change occurred, amongst other examples of metadata. A specific example of metadata indicating a type of infrastructure component includes the metadata identifying the infrastructure component as a virtual machine. A specific example of metadata indicating a location of the infrastructure component includes metadata indicating a specific server which hosts the virtual machine which had a change applied to it. Examples of metadata indicating a type of change which occurred includes metadata indicating whether the change was a change in code, a configuration update such as a change in an operating system or a security certificate of the infrastructure component, amongst other types of changes. A specific example of metadata indicating a time and/or date of a change occurring includes metadata indicating that the change occurred at noon in a specific time zone on a specific calendar date. A specific example of metadata indicating an operation stage of when the change occurred includes metadata indicating that the change occurred during a control plane stage, a rollout stage, and/or a development and operations (DevOps) stage.

In embodiments, the change detection service 114 further utilizes the change analysis engine 116 to group the changes to the infrastructure components 150 based on the metadata. Specifically, the change analysis engine 116 may group the changes based on a type of infrastructure component which was changed. As an example, the change analysis engine 116 may group changes together because the changes were applied to the same virtual machine. In further embodiments, the change analysis engine 116 may group the changes based on a type of change which occurred, in addition to or instead of grouping based on a type of infrastructure component which was changed. As an example, the change analysis engine 116 may group changes together which occurred to specific code, e.g., changes which occurred to a specific programming language. In even further embodiments, the change analysis engine 116 may group the changes based on a stage of when the change occurred, in addition to or instead of grouping based on a type of infrastructure component which was changed and/or a type of change which occurred. As an example, the change analysis engine 116 may group changes together which occurred during a DevOps stage, amongst other stages.

In embodiments, the change detection service 114 further utilizes the change analysis engine 116 to determine correlations between groups of changes and past incidents of service outages to rank the groups of changes. Specifically, a service outage represents a situation in which a service offered by a cloud service is unavailable. As an example, a service outage includes a user of the client device 130 being unable to search within a video streaming cloud service.

In embodiments, the change analysis engine 116 uses machine learning models, i.e., the change learning model 118, to correlate groups of changes to past incidents of service outages of the cloud service. Specifically, the change analysis engine 116 uses machine learning models, i.e., the change learning model 118 to learn which changes were present to the infrastructure components 150 during a service outage. More specifically, the change learning model 118 may implement a correlation algorithm which correlates with a relatively high accuracy infrastructure changes to past incidents of reliability issues. As an example, the change machine learning model 118 learns that a specific change to a code of a virtual machine was present when the cloud service experienced a service outage. As a further example, the change learning model 118 using the correlation algorithm provides correlations based past changes of past incidents in last XX days or YY severity or ZZ blast radius of impact. In embodiments, a blast radius of impact indicates how many aspects of the cloud were down during a service outage.

In embodiments, as the change learning model 118 learns which groups of changes to the infrastructure components 150 were present during a specific service outage, the change learning model 118 develops a knowledge base. In further embodiments, the knowledge base includes which groups of changes were present to a specific service outage. In embodiments, the change machine learning model 118 stores the knowledge base in the data store 112.

In embodiments, the change analysis engine 116 uses the knowledge base to rank the groups of changes based on the past incidents of service outages. Specifically, the change analysis engine 116 ranks groups which are similar to groups present during a past incident which is similar to a current service outage incident higher than other groups. As an example, if a group of changes which represent a change in a specific code were present in a past incident which is similar to a current service outage incident, the change analysis engine 116 ranks this group of changes higher than another group, e.g., a group of changes which represent a change to a specific component. In this way, groups of changes which are similar to groups present during a past incident which is similar to a current service outage incident are ranked higher than other groups of changes.

In embodiments, the machine learning models used by the change learning model 118 include a deep learning model, such as a convolutional neural network (CNN). Other models, such as a logistic regression machine learning model may also be used, amongst other machine learning models.

In embodiments, the change learning model 118 used as part of the change detection service 114 may be trained by a training mechanism 124 such as mechanisms known in the art. The training mechanism 124 may use training datasets stored in the data store 112 or at other locations to provide initial and ongoing training for the change learning model 118. In one implementation, the training mechanism 124 may use the infrastructure change training data from the data store 112 to train change learning model 118 via deep neural networks. In embodiments, the initial training may be performed in an offline stage.

In one implementation, the sets of training data include infrastructure change data detected from the client device 130. In further embodiments, the infrastructure change data is detected directly from the infrastructure components 150, in addition to or instead of the client device 130. In embodiments, the infrastructure components 150 support a cloud service. Examples of a cloud service include a video streaming service, a storage service, and/or any other type of computing service. Further, the infrastructure components 150 may include a tenant, a farm, and/or a physical machine, amongst other examples of computing components which support a cloud service. An example of a tenant is a website.

An example of a farm is a group of physical machines. An example of a physical machine is a computing device, e.g., a server.

In embodiments, the infrastructure change data in the sets of training data include code changes applied to the infrastructure components 150. As an example of a code change, a code of a tenant is changed. In further embodiments, the infrastructure change data also includes configuration updates applied to these infrastructure components 150. As an example, a configuration update is a security certificate of an infrastructure component of the infrastructure components 150 being updated to a relatively newer version of the security certificate. In further embodiments, the configuration updates include a change in an operating system of an infrastructure component of the infrastructure components 150.

In embodiments, the data store 112 may also include testing sets for testing the change learning model 118 after it has been trained to ensure accuracy of the change learning model 118. In one implementation, the types of data used for the sets of training data to train the change learning model 118 may be different from the types of data used in the sets of testing data for testing the change learning model 118. In an example, infrastructure change data detected from the client device 130 is used for training data and development of the change learning model 118, while infrastructure change data detected from the infrastructure components 150 is utilized to evaluate accuracy of the change learning model 118.

In embodiments, the client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices for client device 130 include but are not limited to personal computers, desktop computers, laptop computers, mobile telephones; smart phones; tablets; phablets; smart watches; wearable computers; gaming devices/computers; televisions; and the like. The internal hardware structure of a client device, e.g., client device 130, is discussed in greater detail in regard to FIGS. 5 and 6.

The client device 130 may include one or more applications 136. Each application 136 may be a computer program executed on the client device 130 that configures the device to be responsive to user input to allow the change detection service 114 to detect changes to the infrastructure components 150 applied by the client device, via the application 136. Examples of suitable applications include, but are not limited to, a productivity application (e.g., job searching application that provides a job interview coach or a training application that trains employees such as customer service staff on responding to customers, etc.), a presentation application (e.g., Microsoft PowerPoint), a document editing application, a communications application or a standalone application designed specifically for detecting changes to the infrastructure components 150.

In some examples, applications used to detect infrastructure change data from user input may be executed on the server 110 (e.g., applications 122) and be provided via an online service. In one implementation, web applications may communicate via the network 140 with the user agent 132, such as a browser, executing on the client device 130. The user agent 132 may provide a user interface 138 that allows the user to interact with applications 122 and may enable applications 122 to provide infrastructure change data to the change detection service 114 for processing. In other examples, applications used to detect infrastructure change data may be local applications such as the applications 136 that are stored and executed on the client device 130 and provide the user interface 138 that allows the user to interact with the application, e.g., applications 122. Infrastructure change data from applications 136 may also be provided via the network 140 to the change detection service 114 for use in detecting changes to infrastructure components 150. In even further examples, the change detection service 114 may be applied directly on a device, e.g., client device 130.

In embodiments, the change detection service 114 displays the infrastructure change data to a user of the client device 130. Specifically, the change detection service 114 displays the infrastructure change data through a user interface 138, as an example. In further embodiments, the change detection service 114 utilizes application 122 and/or application 136 to display the user interface 138 as a graphical user interface to the user. Examples of the infrastructure change data displayed to the user includes the metadata associated with the changes, along with correlations to past changes of previous service outages, and rankings of the groups of changes. In even further embodiments, the change recognition service displays the ranked groups of changes to a user. In this way, the change detection service 114 display information of changes to infrastructure components 150 in a user interface 138, thereby making visible to a user any changes which may have caused a current reliability issue, e.g., a service outage.

Figure 2:
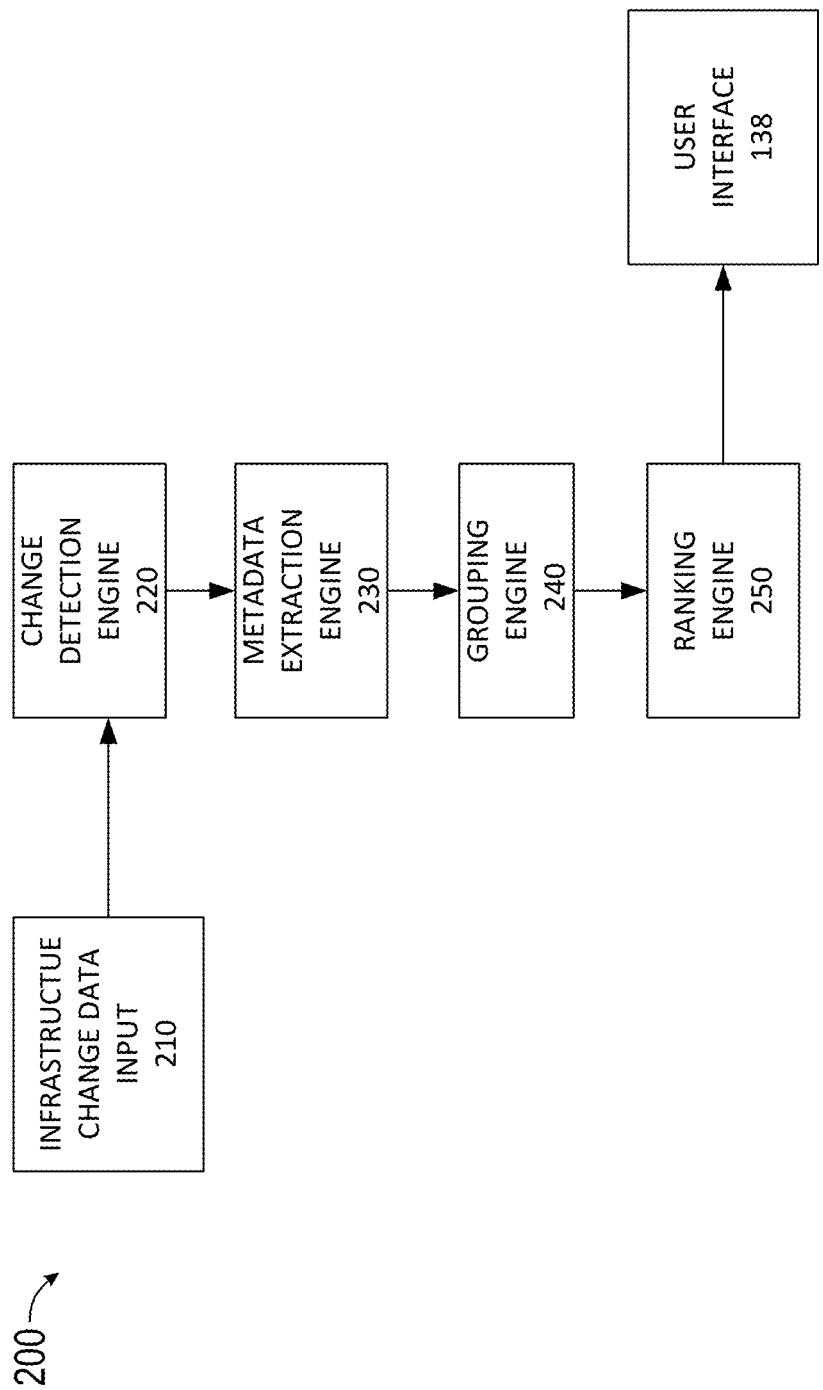
FIG. 2 depicts a simplified architecture for operations of a detection engine used to detect root causes.

FIG. 2 depicts a simplified architecture 200 for use by the change analysis engine 116 to develop change learning model 118 for detection of changes applied to infrastructure components. Architecture 200 may include infrastructure change data input 210 which may be received from the client device 130 and/or the infrastructure components 150. In embodiments, the infrastructure change data input 210 includes service trees and/or object maps of the infrastructure components 150. In further embodiments, the information within the service trees and/or object maps allows for the detection of changes applied to the infrastructure components 150, and/or configuration updates applied to the infrastructure components, amongst other changes to the infrastructure components 150.

In embodiments, in response to the change detection service 114 collecting the infrastructure change data input 210 and the change analysis engine 116 receiving the infrastructure change data input 210, the change analysis engine 116 implements a change detection engine 220. Specifically, the change detection engine 220 uses a deep learning model to analyze the service trees and/or object maps of the infrastructure components 150.

In embodiments, in response to the change detection service 114 detecting changes to infrastructure components 150 from infrastructure change data input 210, the change analysis engine 116 implements a metadata extraction engine 230. Specifically, the metadata extraction engine 230 analyzes the detected changes for metadata. Examples of metadata include a type of infrastructure component the change was applied to, a location of the infrastructure component, a type of change which occurred, a time of and/or date of a change occurring, and a stage of when the change occurred, amongst other examples of metadata. In embodiments, the metadata extraction engine 230 uses the change learning model 118, along with language processing techniques, e.g., natural language processing techniques, to extract the metadata. As an example, the language processing techniques detect a word of "server" for the change, thereby extracting the metadata for a type of infrastructure component.

In response to extracting metadata from the detected changes, the change analysis engine 116 implements a grouping engine 240. In embodiments, the grouping engine 240 groups the detected changes based on the extracted metadata. Specifically, the grouping engine 240 groups the detected changes in view of rules. As an example, a rule may indicate that detected changes to a specific type of infrastructure component be grouped in a first group representing that type of component. In embodiments, the rules may be designated by a user of the client device 130 and/or an administrator of the cloud service, amongst other individuals.

In response to grouping the detected changes into groups, the change analysis engine 116 implements a ranking engine 250. In embodiments, the ranking engine 250 ranks the groups in view of correlations between the groups of changes to past groups of changes for past incidents of service outages. Specifically, the ranking engine 250 uses a knowledge base from the data store 112 to correlate the groups of changes to past groups of changes for past incidents of service outages. In embodiments, the ranking engine 250 ranks correlated groups of changes which are similar to past groups of changes present during a past incident which is similar to a current service outage higher than other groups of correlated changes. In response to ranking the groups of correlated changes, the change analysis engine 116 displays the ranked groups to a user of the client device 130 through a user interface 138.

Figure 3A:
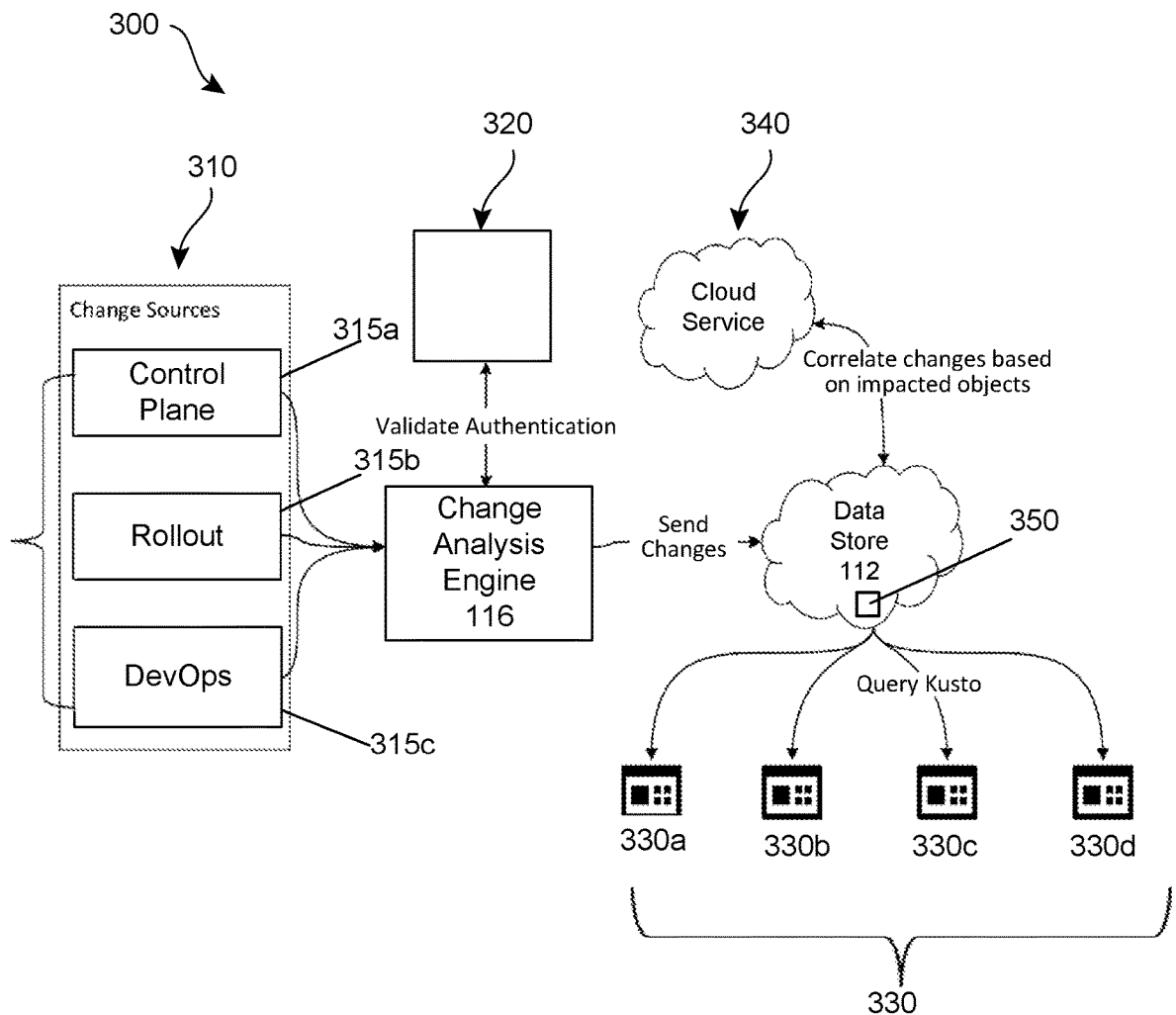
FIGS. 3A and 3B depict a block diagram for detecting changes to infrastructure components which support a cloud service.
Figure 3B:
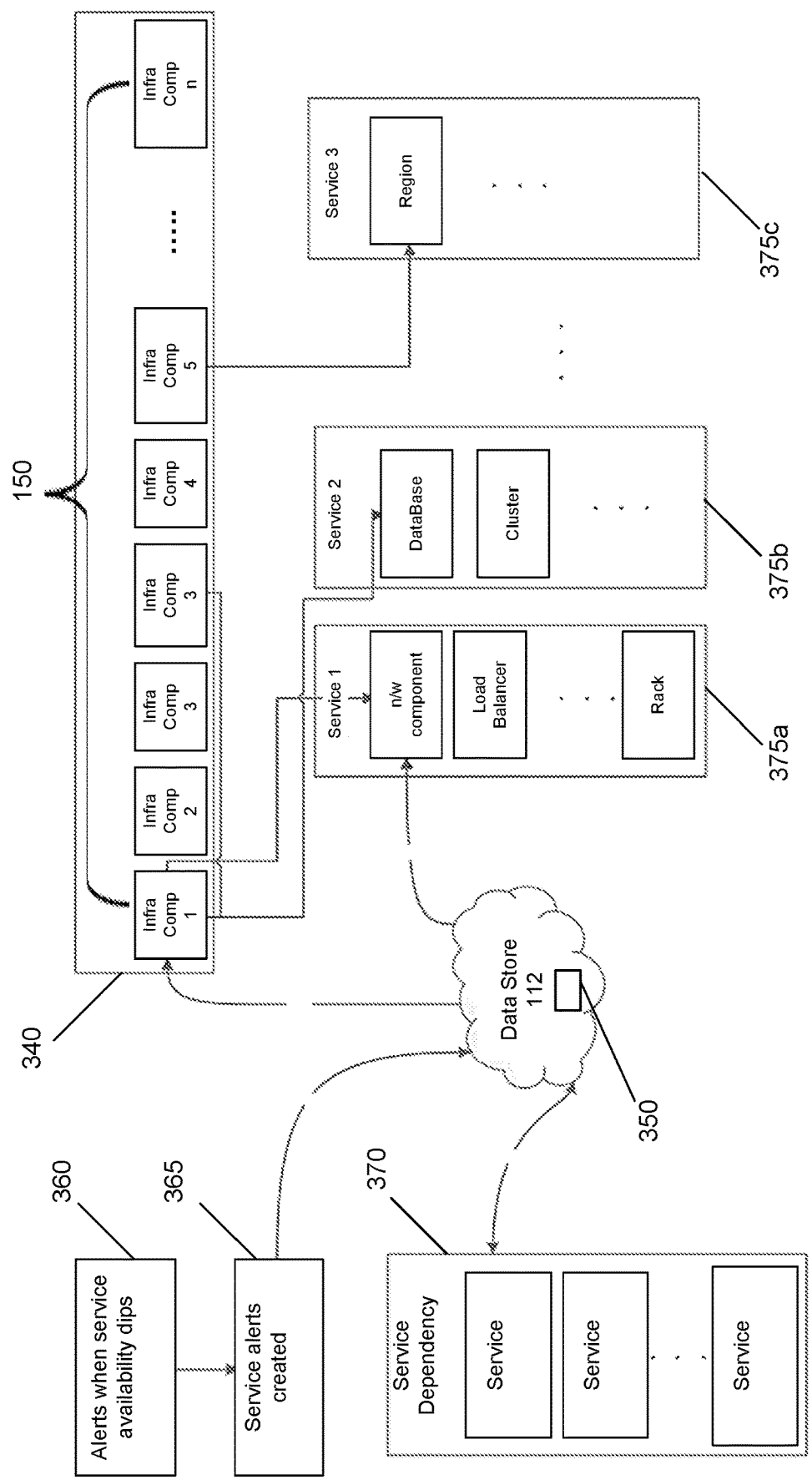

FIGS. 3A and 3B depict a simplified block diagram 300 for detecting changes to infrastructure components 150. With reference to FIGS. 1 and 2, a cloud service 340 is supported by various infrastructure components 150. In embodiments, the cloud service 340 provides various services 375 to a user, e.g., 375a, 375b, and 375c. As examples, service 375a may be a networking service, service 375b may be a database service, and service 375a may be a cache service, amongst other services. Examples of infrastructure components 150, i.e., Infra Comp 1 through Infra Comp n, include farms, virtual machines, physical machines, user properties, and site collections, amongst other infrastructure components, amongst other infrastructure components 150. In embodiments, changes in these infrastructure components 150 may result in users experiencing reliability issues, e.g., a service outage, with respect to the cloud service 340.

In embodiments, the change detection service 114 uses the change analysis engine 116 to detect changes 310, 320 using the infrastructure change data input 210. Specifically, the change analysis engine 116 may begin to detect changes 310, 320 in response to receiving alerts 360, 365. In embodiments, the alerts 360, 365 indicate a potential issue with an infrastructure component of the infrastructure components 150 and/or a service of the services 375 provided by the cloud service 340. As an example, alert 360 indicates when an availability of a service of the services 375 dips, while alert 365 indicates when a service alert is created in response to a service of the services 375 is unavailable, i.e., a service outage. As another example, alert 360 indicates when a performance of an infrastructure component dips, while alert 365 indicates when a service alert is created in response to an infrastructure component being unavailable, i.e., a service outage. In this example, the change detection service 114 detects alerts of a service outage caused by the changes to the infrastructure components 150.

As shown in FIG. 3B, the change detection service 114 detects changes 310 to the infrastructure components 150. In embodiments, changes 310 represent changes which occur during different operation stages 315 of the cloud service 340. Specifically, changes 310 include changes to infrastructure components 150 during a control plane stage 315a, a rollout stage 315b, and/or a DevOps stage 315c. In embodiments, in addition to or instead of detecting changes 310, the change analysis engine 116 may also detect configuration update changes 320. Examples of configuration update changes 320 include an update to a security certificate of an infrastructure component, and/or an update to an operating system of an infrastructure component, amongst other examples. In embodiments, the change analysis engine 116 may detect the changes 310 to the infrastructure components 150 by examining a service tree such as service dependency 370 and/or an object map of the infrastructure components 150. As shown in FIG. 3B, service dependency 370 provides information for offerings, services, components, and endpoints that support the cloud service 340. As an example, service dependency 370 indicates that the cloud service 340 has various services, i.e., Service 1 through Service n, that depend on each other.

In embodiments, in response to detecting the changes 310, 320, the change analysis engine 116 extracts metadata from the changes 310, 320. Extraction of metadata includes extracting information related to the changes 310, 320, such as a type of infrastructure component that was changed, a location of the infrastructure component, a type of change which occurred, a time of and/or date of a change occurring, and an operation stage of when the change occurred, amongst other examples of metadata.

In embodiments, the change analysis engine 116 groups the changes 310, 320 into groups 330 based on the metadata in view of rules. As an example, group 330a may represent changes for a type of infrastructure component which was changed, and a rule indicates that changes which are applied to this type of infrastructure component should be grouped together. As a more specific example, group 330a represents changes which occurred to a specific virtual machine which supports the cloud service 340. As another example, group 330b may represent changes of a specific type which occurred. As a more specific example, group 330b represents changes to a specific portion of code which supports the cloud service 340. As another example, group 330c may represent changes which occurred at a specific stage. As a more specific example, group 330c represents changes which occurred during the rollout stage 315b. In this way, the change detection service 114 groups the changes based on the metadata by grouping the changes based on an operation stage in which the changed occurred. As another example, group 330d may represent changes which occurred at a specific location. As a more specific example, group 330d represents changes which occurred at a specific location hosting servers which support the cloud service 340.

In embodiments, in response to detecting the changes 310, 320, extracting the metadata, and grouping the changes 310, 320, the change analysis engine 116 ranks the groups 330a, 330b, 330c, 330d by correlating the groups 330a, 330b, 330c, 330d to past groups of changes for past incidents of service outages with respect to the cloud service 340. Specifically, the change analysis engine 116 builds a knowledge base 350 using the detected changes 310, 320, the extracted metadata, the groups 330, the correlations of the groups 330, and the rankings of the groups 330. In embodiments, the change analysis engine 116 uses the knowledge base 350 in response to future service outages. As an example, the change analysis engine 116 uses the knowledge base 350 to compare current correlated groups of changes to past groups of changes of past incidents of service outages. This comparison allows for the change analysis engine 116 to rank the correlated groups of changes.

Figure 4:
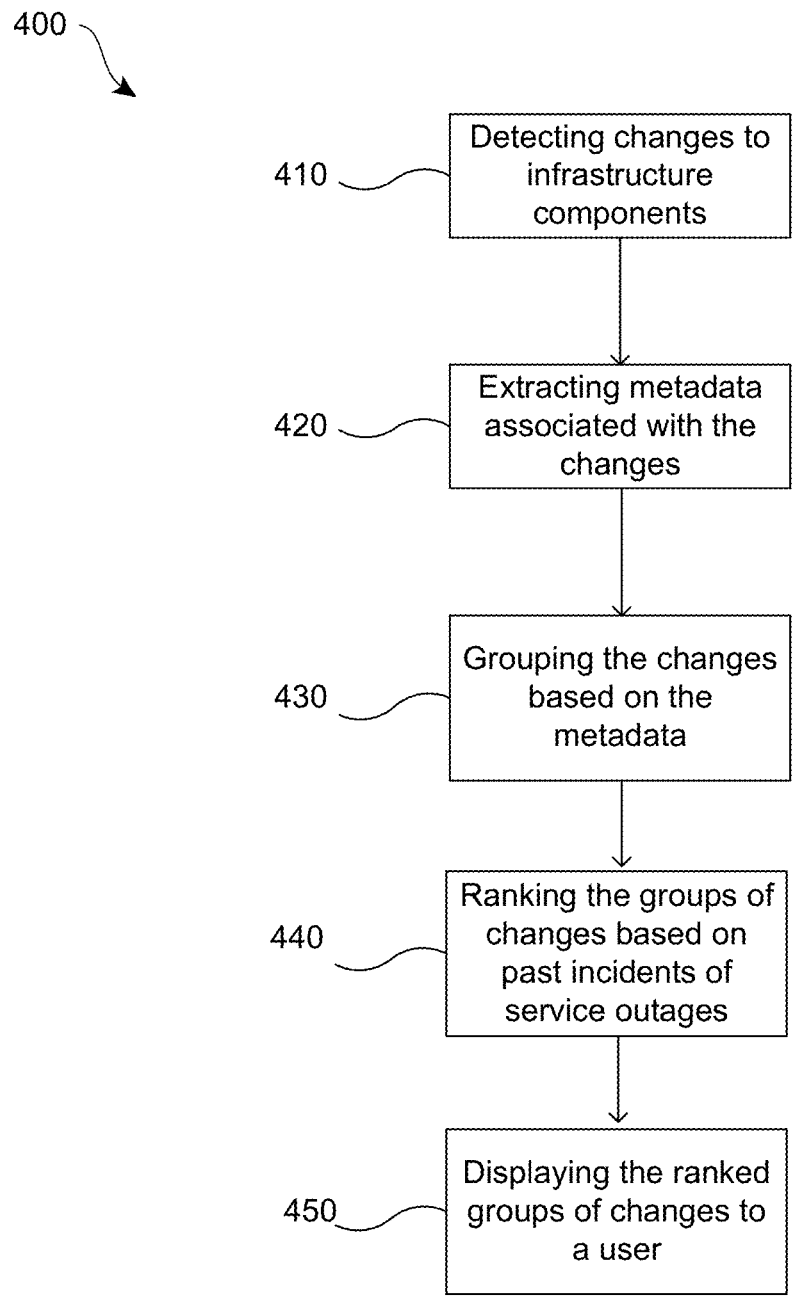
FIG. 4 is a flow diagram of a process for root cause detection.

FIG. 4 is a flow diagram of a process 400 for detecting changes to infrastructure components 150 in response to a service outage of a cloud service 340. With reference to FIGS. 1-3B, at step 410, the change detection service 114 detects changes 310, 320 to infrastructure components 150. In embodiments, the change detection service 114 detects changes 310, 320 by using a deep learning model to analyze service trees and/or object maps within the infrastructure change data input 210.

At step 420, the change detection service 114 extracts metadata associated with the changes 310, 320. In embodiments, the change detection service 114 extracts the metadata from the changes 310, 320 using the change learning model 118, along with language processing techniques.

At step 430, the change detection service 114 groups the changes based on the metadata. In embodiments, the change detection service 114 groups the detected changes into the groups 330 in view of rules. These rules may be designated by a user of the client device 130 and/or an administrator of the cloud service 340, amongst other individuals.

At step 440, the change detection service 114 ranks the groups of changes based on the past incidents of service outages. In embodiments, the change detection service 114 uses the knowledge base 350 to compare the groups 330 to past groups of changes of past incidents of service outages.

At step 450, the change detection service 114 displays the ranked groups of changes to a user. In embodiments, the change detection service 114 displays the ranked groups of changes by utilizing application 122 and/or application 136. Specifically, the change detection service 114 displays the ranked groups of changes on the user interface 138, thereby making visible to a user any changes which may have caused a current reliability issue, e.g., a service outage.

Figure 5:
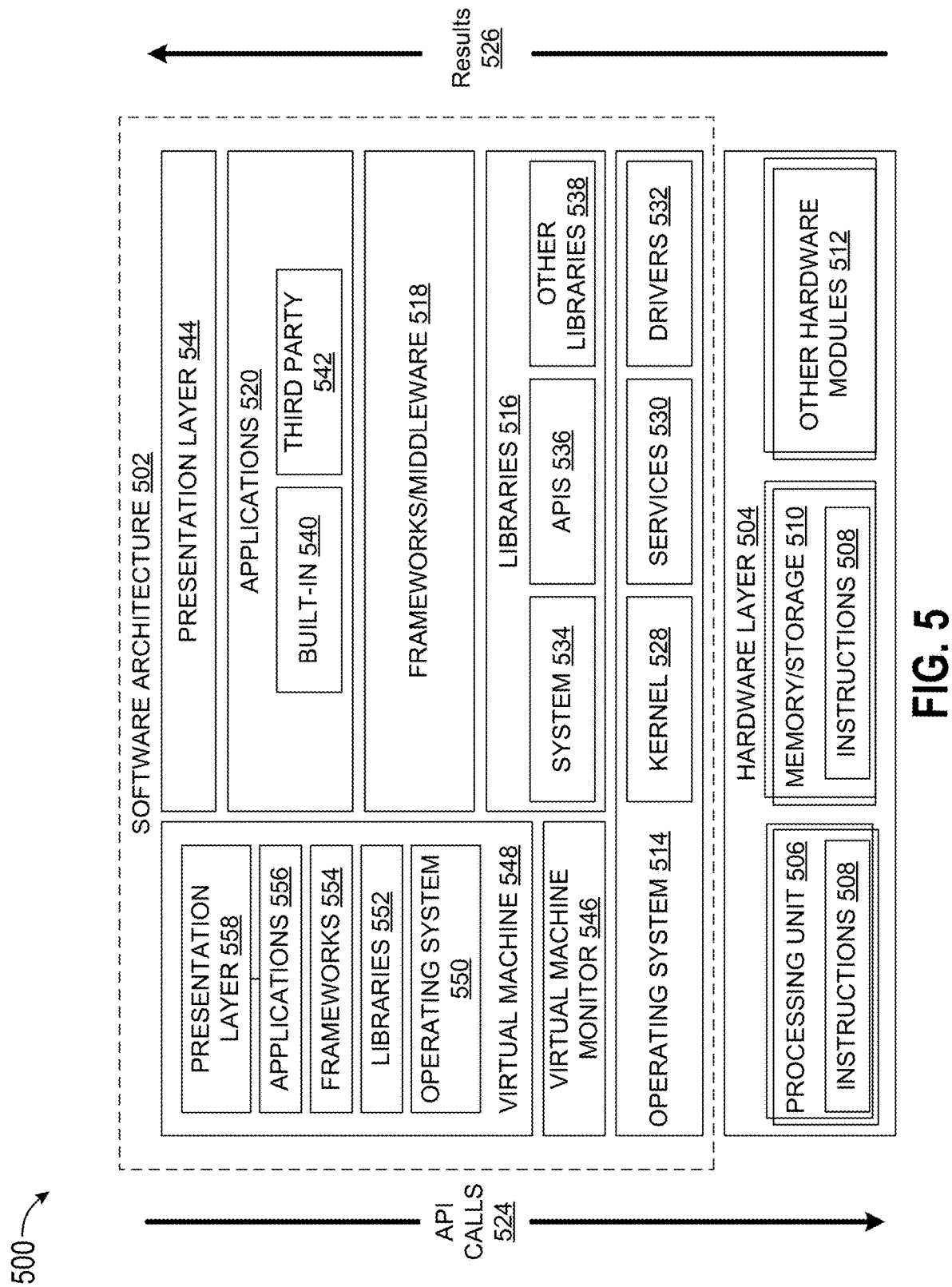
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 528. The virtual machine 548 provides an execution environment where applications/modules can execute as if they were executing on a hardware machine (such as the machine 600 of FIG. 6, for example).

The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
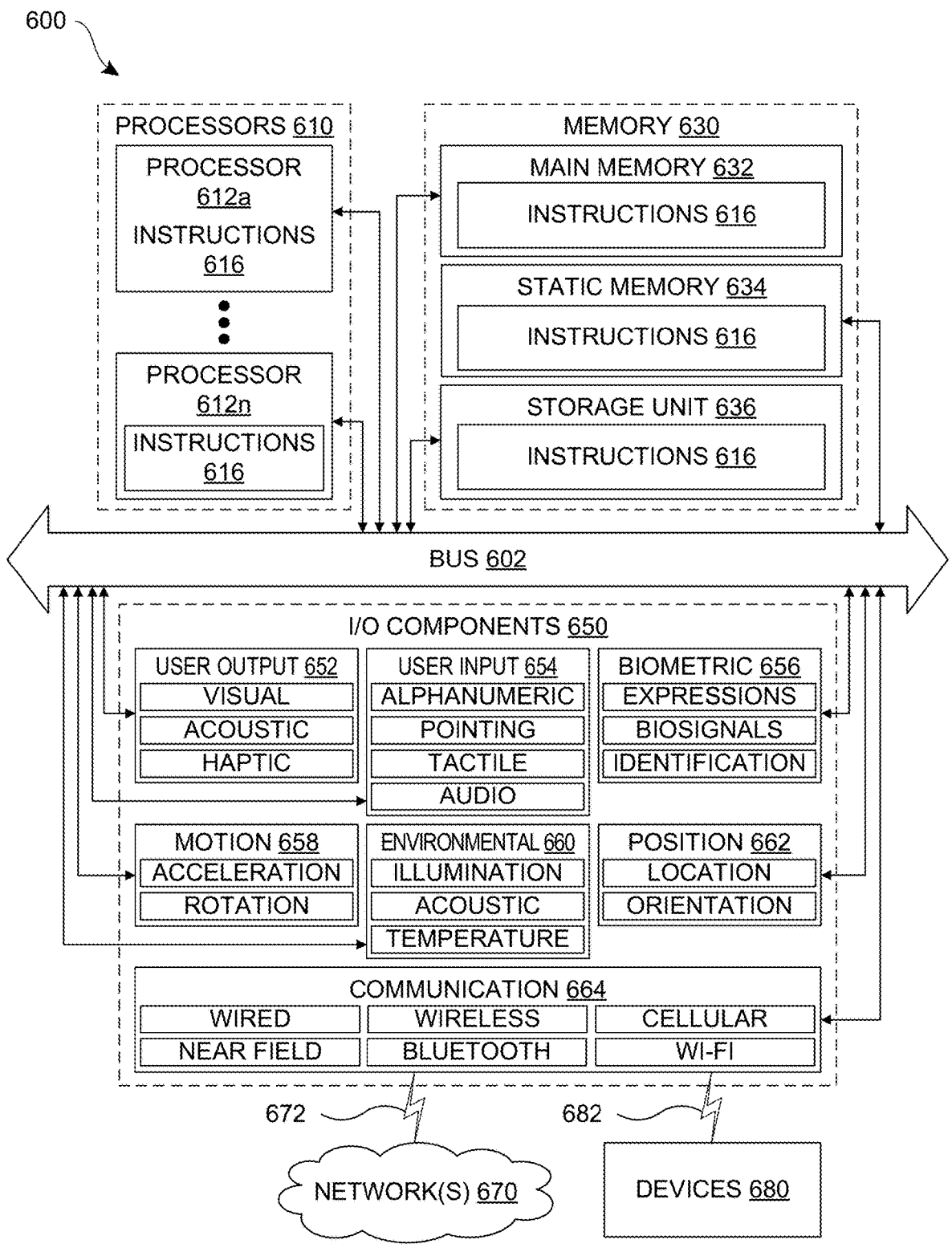
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

In further examples, the I/O components 650 may include motion components 658, which may include acceleration and/or rotation sensors. In embodiments, the I/O components 650 may include environmental components 660, which may include illumination, acoustic, and/or temperature sensors. In further embodiments, the I/O components 650 may include position components 660, which may include location and/or orientation sensors.

The I/O components 650 may also include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

Devices and methods for root cause detection of a service outage for a cloud service are described. Devices can include a data processing system which includes processor, and a memory in communication with the processor, the memory comprising executable instructions that, when executed by the processor, cause the data processing system to perform various functions. The functions may include detecting changes to infrastructure components, extracting metadata associated with the changes, grouping the changes based on the metadata, ranking the groups of changes based on past incidents of service outages, and displaying the ranked groups of changes to a user.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the instant application will be described by means of items:

Item 1. A data processing system comprising:
a processor; and
a machine-readable storage medium storing executable instructions that, when executed, cause the processor to perform operations of:
receiving speech data for a plurality of languages;
determining letters from the speech data;
normalizing the speech data using the determined letters;
building a computer model using the normalized speech data; and
recognizing words in a target language using the computer model.

Item 2. The data processing system of item 1, wherein the metadata includes a type of infrastructure component, a location of an infrastructure component, a time of a change, and a date of a change.

Item 3. The data processing system of any one of items 1-2, wherein the infrastructure components include a tenant, a farm, virtual machine, and a physical machine.

Item 4. The data processing system of any one of items 1-3, wherein the infrastructure components support a cloud service.

Item 5. The data processing system of any one of items 1-4, wherein the machine-readable storage medium includes instructions configured to cause the processor to perform an operation of:
detecting alerts of a service outage caused by the changes to the infrastructure components.

Item 6. The data processing system of any one of items 1-5, wherein the changes include configuration updates to the infrastructure components.

Item 7. The data processing system of any one of items 1-6, wherein the detecting the changes to the infrastructure components includes analyzing a service tree of the infrastructure components.

Item 8. The data processing system of any one of items 1-7, wherein the detecting the changes to the infrastructure components includes analyzing an object map of the infrastructure components.

Item 9. A method implemented in a data processing system, the method comprising:
detecting changes to infrastructure components;
extracting metadata associated with the changes;
grouping the changes based on the metadata;
ranking the groups of changes based on past incidents of service outages; and
displaying the ranked groups of changes to a user.

Item 10. The method of item 9, wherein the changes to the infrastructure components include a code change applied to the infrastructure components and a configuration update applied to the infrastructure components.

Item 11. The method of any one of items 9-10, wherein the ranking the groups of changes includes correlating the groups of changes to past groups of changes of the past incidents of service outages.

Item 12. The method of any one of items 9-11, further comprising:
detecting alerts of a service outage caused by the changes to the infrastructure components.

Item 13. The method of any one of items 9-12, wherein the detecting the changes to the infrastructure components includes analyzing a service tree of the infrastructure components.

Item 14. The method of any one of items 9-13, wherein the detecting the changes to the infrastructure components includes analyzing an object map of the infrastructure components.

Item 15. The method of any one of items 9-14, wherein the grouping the changes based on the metadata includes grouping based on an operation stage in which the changes occurred.

Item 16. The method of any one of items 9-15, wherein the ranking the groups of changes includes correlating the groups of changes to past groups of changes of the past incidents of service outages.

Item 17. A machine-readable medium on which are stored instructions that, when executed, cause a processor of a programmable device to perform operations of:
detecting changes to infrastructure components;
extracting metadata associated with the changes;
grouping the changes based on the metadata;
ranking the groups of changes based on past incidents of service outages; and
displaying the ranked groups of changes to a user.

Item 18. The machine-readable medium of item 17, wherein the metadata includes a type of infrastructure component, a location of an infrastructure component, a time of a change, and a date of a change.

Item 19. The machine-readable medium of any one of items 17-18, wherein the infrastructure components include a tenant, a farm, virtual machine, and a physical machine.

Item 20. The machine-readable medium of any one of items 17-19, wherein infrastructure components support a cloud service.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable storage medium storing executable instructions that, when executed, cause the processor to perform operations of:
   detecting software changes to infrastructure components;
   extracting metadata associated with the software changes;
   grouping the software changes based on the metadata;
   determining correlations between the groups of software changes and past incidents of service outages, the past incidents of service outages including situations in which a service offered by a cloud service supported by the infrastructure components is unavailable;
   ranking the groups of software changes based on the determined correlations; and
   displaying the ranked groups of software changes to a user,
   wherein the software changes to the infrastructure components include at least one of a code change applied to the infrastructure components and a configuration update applied to the infrastructure components.

2. The data processing system of claim 1, wherein the metadata includes a type of infrastructure component, a location of an infrastructure component, a time of a change, and a date of a change.

3. The data processing system of claim 1, wherein the infrastructure components include a tenant, a farm, virtual machine, and a physical machine.

4. The data processing system of claim 1, wherein the infrastructure components support a cloud service.

5. The data processing system of claim 1, wherein the machine-readable storage medium includes instructions configured to cause the processor to perform an operation of:
   detecting alerts of a service outage caused by the changes to the infrastructure components.

6. The data processing system of claim 1, wherein the detecting the software changes to the infrastructure components includes analyzing a service tree of the infrastructure components.

7. The data processing system of claim 1, wherein the detecting the software changes to the infrastructure components includes analyzing an object map of the infrastructure components.

8. A method implemented in a data processing system, the method comprising:
   detecting software changes to infrastructure components;
   extracting metadata associated with the software changes;
   grouping the software changes based on the metadata;
   determining correlations between the groups of software changes and past incidents of service outages, the past incidents of service outages including situations in which a service offered by a cloud service supported by the infrastructure components is unavailable;
   ranking the groups of software changes based on the determined correlations; and
   displaying the ranked groups of software changes to a user,
   wherein the software changes to the infrastructure components include at least one of a code change applied to the infrastructure components and a configuration update applied to the infrastructure components.

9. The method of claim 8, wherein the ranking the groups of software changes includes correlating the groups of changes to past groups of changes of the past incidents of service outages.

10. The method of claim 8, further comprising:
    detecting alerts of a service outage caused by the software changes to the infrastructure components.

11. The method of claim 8, wherein the detecting the software changes to the infrastructure components includes analyzing a service tree of the infrastructure components.

12. The method of claim 8, wherein the detecting the software changes to the infrastructure components includes analyzing an object map of the infrastructure components.

13. The method of claim 8, wherein the grouping the software changes based on the metadata includes grouping based on an operation stage in which the software changes occurred.

14. A non-transitory machine-readable medium on which are stored instructions that, when executed, cause a processor of a programmable device to perform operations of:
    detecting software changes to infrastructure components;
    extracting metadata associated with the software changes;
    grouping the software changes based on the metadata;
    determining correlations between the groups of software changes and past incidents of service outages, the past incidents of service outages including situations in which a service offered by a cloud service supported by the infrastructure components is unavailable;
    ranking the groups of software changes based on the determined correlations; and
    displaying the ranked groups of software changes to a user,
    wherein the software changes to the infrastructure components include at least one of a code change applied to the infrastructure components and a configuration update applied to the infrastructure components.

15. The non-transitory machine-readable medium of claim 14, wherein the metadata includes a type of infrastructure component, a location of an infrastructure component, a time of a change, and a date of a change.

16. The non-transitory machine-readable medium of claim 14, wherein the infrastructure components include a tenant, a farm, virtual machine, and a physical machine.

17. The non-transitory machine-readable medium of claim 14, wherein infrastructure components support a cloud service.

* * * * *